No. 674,070. Patented May 14, 1901.
E. J. STEWART.
MACHINE FOR MAKING EXCELSIOR.
(Application filed June 13, 1900.)
(No Model.) 4 Sheets—Sheet 1.

Witnesses
W. C. Colies
Wm. Geiger

Inventor
Edgar J. Stewart
By Louis K. Gleeson
Atty

No. 674,070.  
E. J. STEWART.  
MACHINE FOR MAKING EXCELSIOR.  
(Application filed June 13, 1900.)

Patented May 14, 1901.

(No Model.)  
4 Sheets—Sheet 2.

Witnesses  
W. C. Calvés  
Wm. Geiger

Inventor  
Edgar J. Stewart  
By Louis K. Gilson Atty

No. 674,070. Patented May 14, 1901.
E. J. STEWART.
MACHINE FOR MAKING EXCELSIOR.
(Application filed June 13, 1900.)

(No Model.) 4 Sheets—Sheet 3.

Witnesses
W. E. Coclies
Wm. Geiger

Inventor
Edgar J Stewart
By Louis K Gleason
Atty

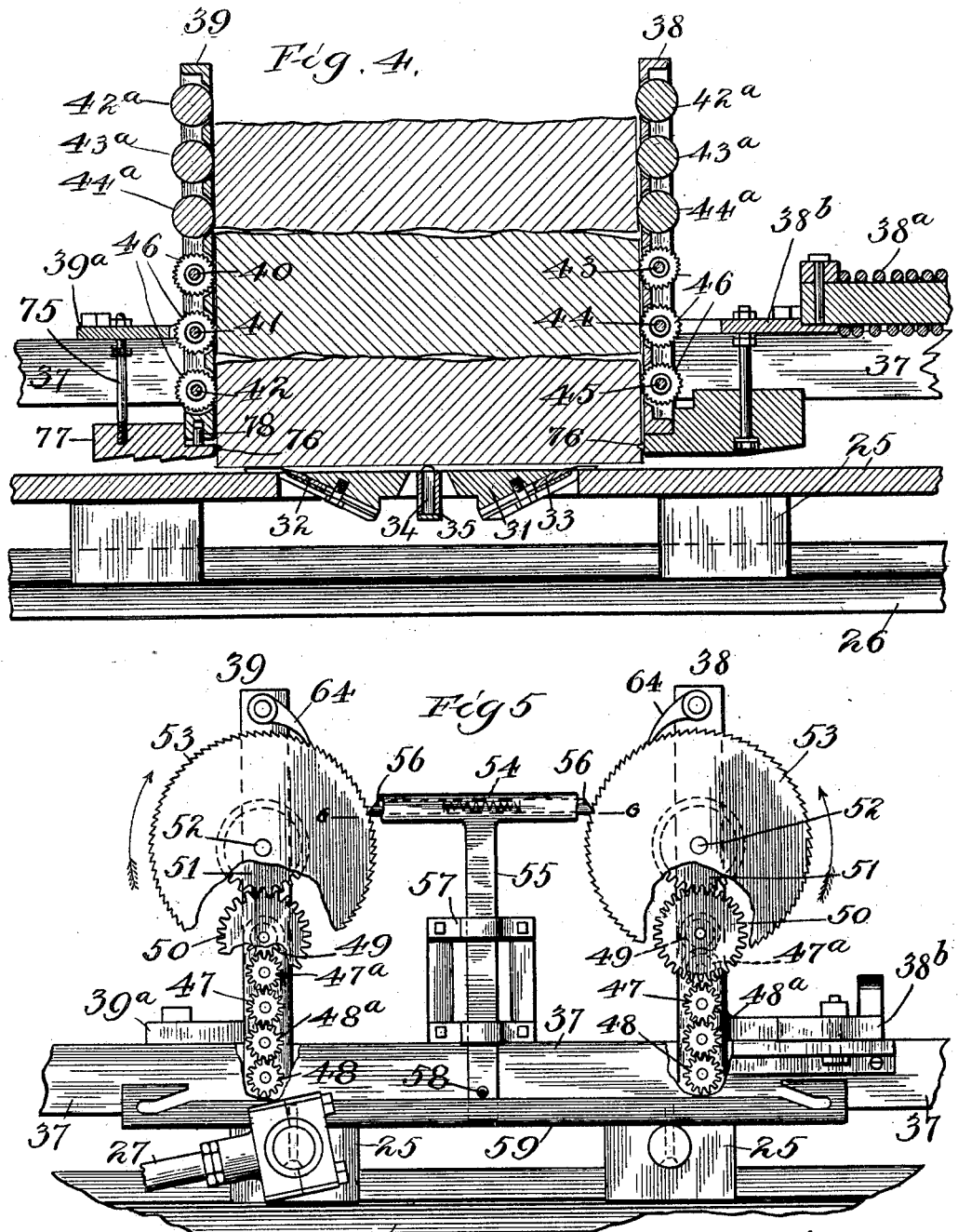

UNITED STATES PATENT OFFICE.

EDGAR J. STEWART, OF DES PLAINES, ILLINOIS.

MACHINE FOR MAKING EXCELSIOR.

SPECIFICATION forming part of Letters Patent No. 674,070, dated May 14, 1901.

Application filed June 13, 1900. Serial No. 20,199. (No model.)

*To all whom it may concern:*

Be it known that I, EDGAR J. STEWART, a citizen of the United States, and a resident of Des Plaines, county of Cook, and State of Illinois, have invented certain new and useful Improvements in Machines for Making Excelsior, of which the following is a specification, and which are illustrated in the accompanying drawings, forming a part thereof.

This invention relates to that type of excelsior-making machines in which a reciprocating plate carries shaving-knives and scoring-blades, means being provided for holding the material to be reduced in the path of such knives and blades.

The object of the invention is to generally improve machines of this type, and particularly to provide improved feed mechanism, the invention consisting in the construction hereinafter fully described and which is illustrated in the accompanying drawings, in which—

Figure 1:
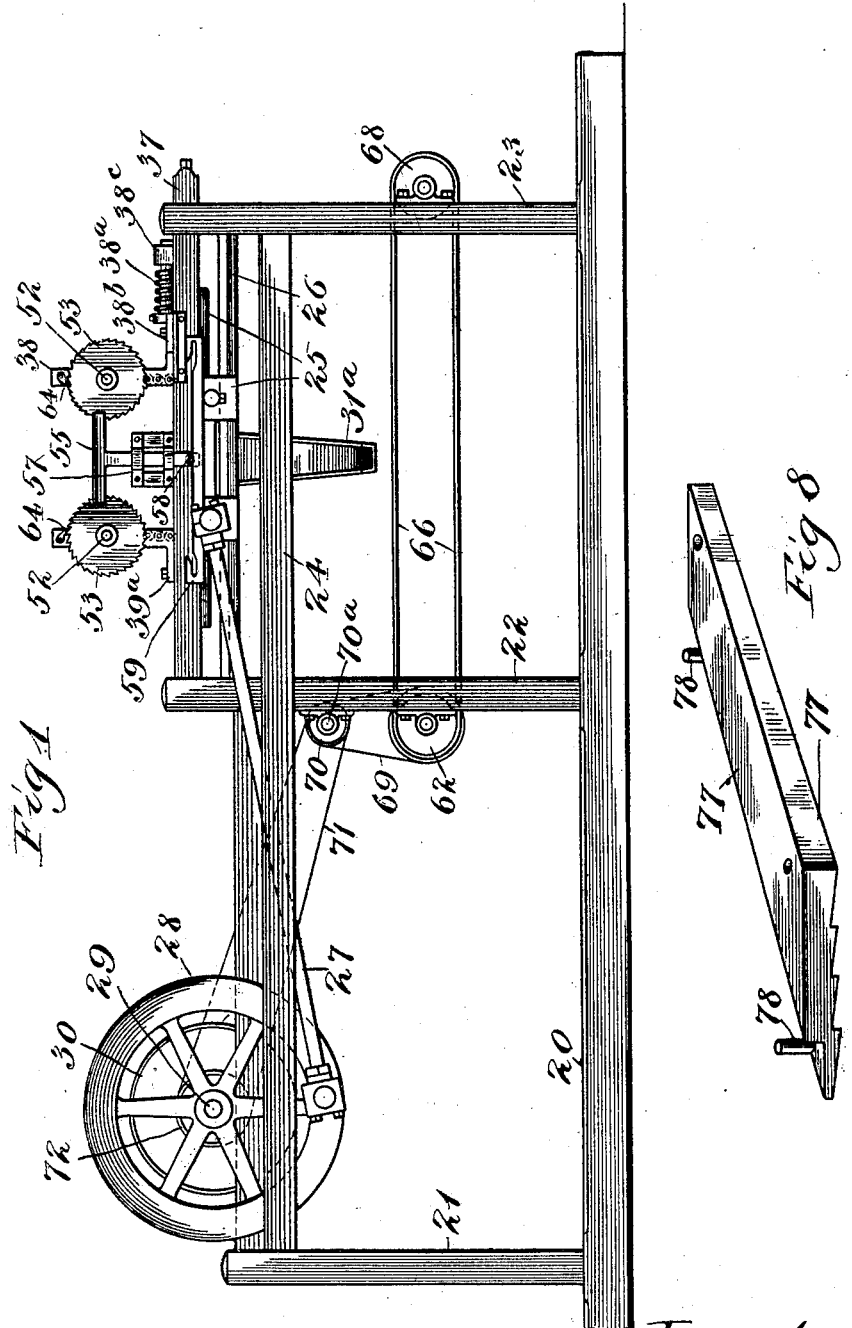
Figure 2:
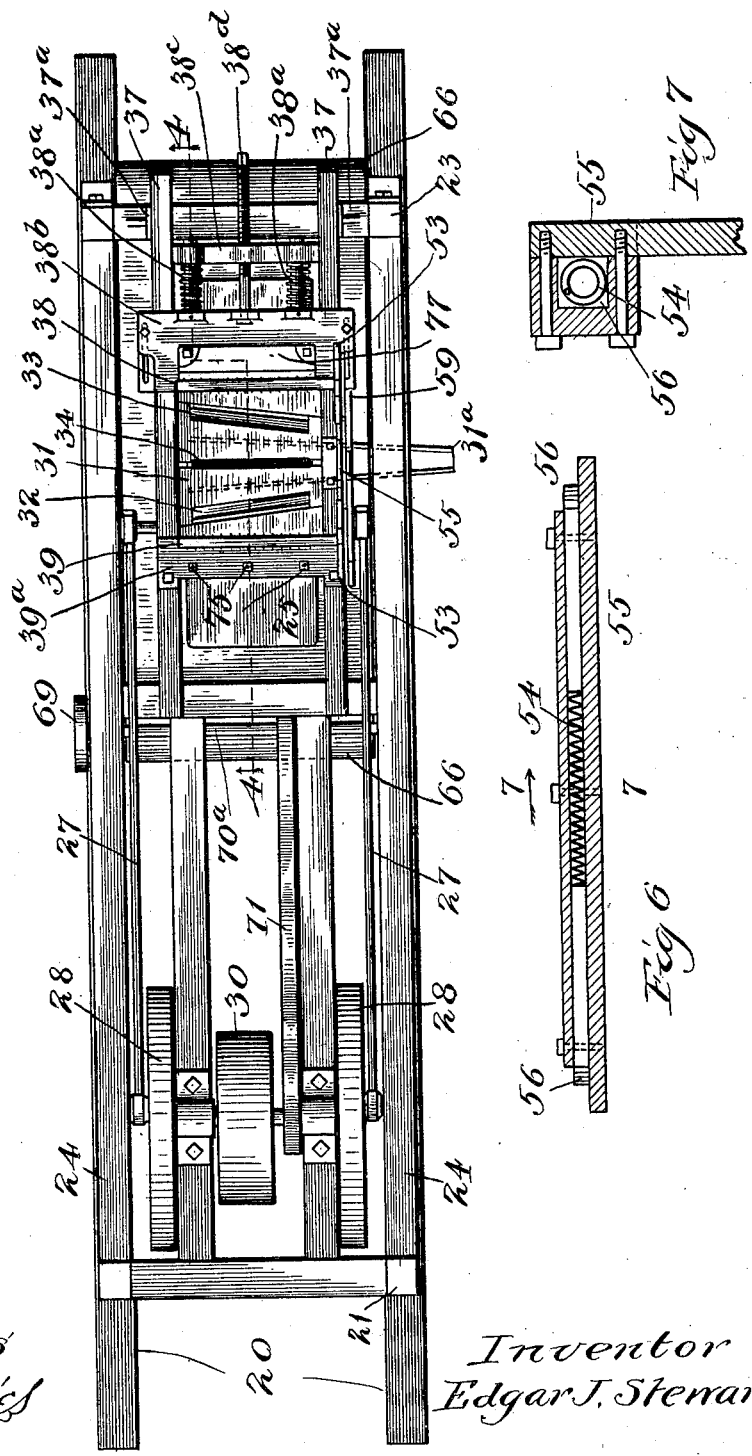
Figure 3:
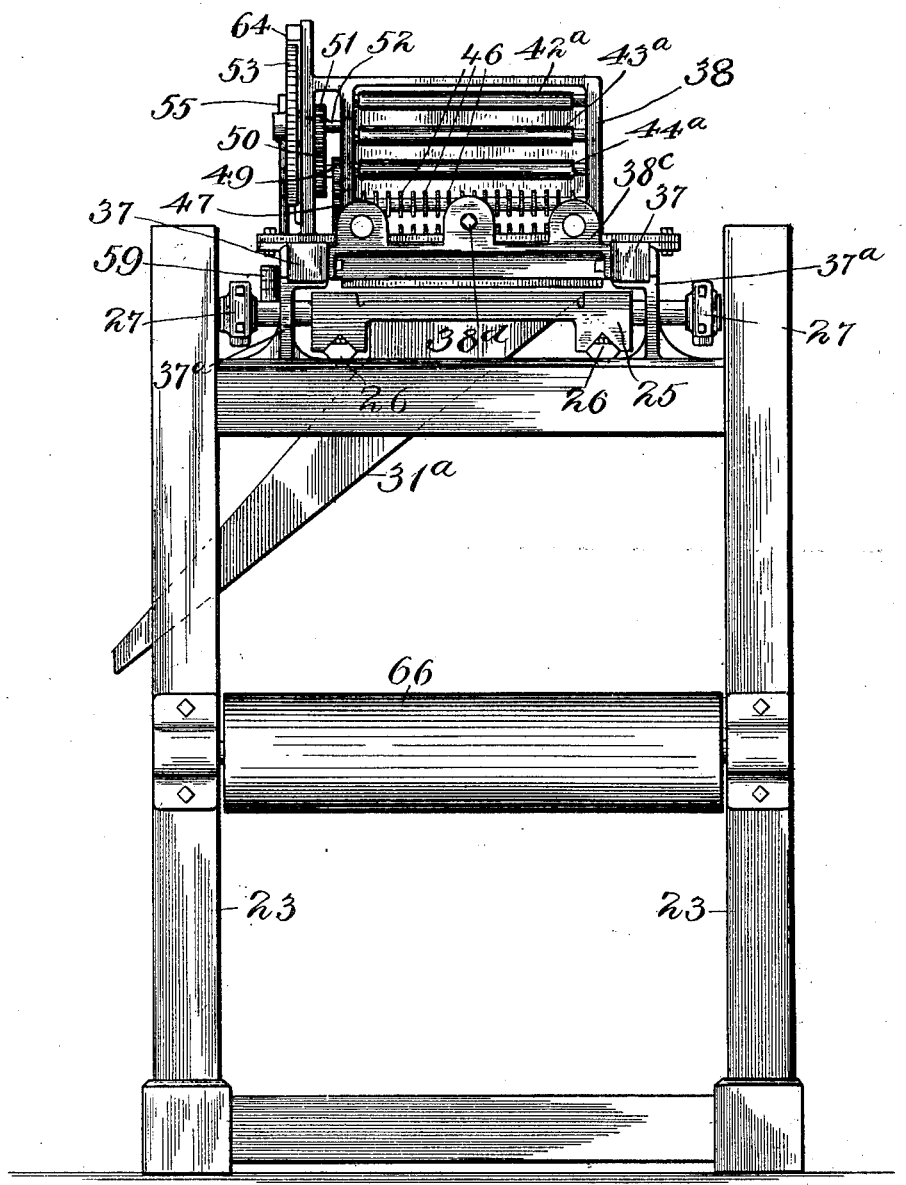

Figure 1 is a side elevation of the machine. Fig. 2 is a plan view of the same. Fig. 3 is an end elevation of the machine. Fig. 4 is a sectional view on the line 4 4 of Fig. 2. Fig. 5 is a detail side elevation, some of the parts being broken away. Fig. 6 is a sectional view on the line 6 6 of Fig. 5. Fig. 7 is a sectional view on the line 7 7 of Fig. 6. Fig. 8 is a perspective of the remnant-discharging plate.

The machine is provided with a suitable frame, as shown, comprising a floor-plate 20, uprights 21 22 23, fixed therein, and longitudinal rails 24, carrying the bed of the machine.

A carriage 25 reciprocates upon suitable ways 26, carried by the frame, and is driven by means of a pitman 27, leading from a crank-wheel 28, mounted upon a power-shaft 29, which carries a belt-pulley 30, to which power may be applied.

A knife-plate 31 is secured to the carriage 25, and at the two edges of this plate there are located slots through which project cutting or shaving blades 32 33, secured to the under face of the plate 31, their cutting edges being oppositely directed, so that one of them will act upon the material in each direction of movement of the carriage. These blades are set diagonally across the carriage and are inclined in opposite directions, so that the lateral pressure applied by both of them to the material tends to crowd it to the same side of the machine. The knives 32 33 are beveled to bring them to a cutting edge, and the beveled side is upward.

Within a transverse slot in the plate 31 there is mounted a series of scoring-blades 34. These blades project directly upward from the face of the plate, and their cutting edges are longitudinal as to the carriage, so that their action upon the material is simply to cut grooves therein. Their distance apart is equal to the thickness at which the material is to be cut. The blades 34 are fitted within a box 35, which is secured within a transverse recess in the plate 31, so that the points of the blades project above the plane of the reciprocating table.

Upon a pair of rails 37 37, located above and longitudinal as to the carriage and supported by brackets 37$^a$, rising from the frame of the machine, there is mounted a pair of guide-frames 38 39, between which the material to be reduced is fed to the cutters. One of these frames, as 39, is preferably fixed, and the other is in sliding engagement with the rails 37 and is held in place by means of expansion-springs 38$^a$, reacting between a block fixed to a bracket 38$^b$, fixed to the rearward side of the frame, and a bracket 38$^c$, secured to the rails 37. A screw-rod 38$^d$, running in a threaded aperture in the bracket 38$^c$ and engaging a block rising from the bracket 38$^b$, provides for the manual retraction of the frame 38 against the pressure of the springs 38$^a$.

The frames 38 and 39 are each provided with a plurality of shafts, as many in number as may be desired, and some or all of these shafts are power-driven and carry spur-wheels for engaging the material to feed it down against the knives. Such feeding-rollers are shown at 40, 41, and 42 in connection with the frame 39 and at 43, 44, and 45 in connection with the frame 38, and each of these rollers is armed with a plurality of serrated disks 46, which project beyond the front faces of the frames, so as to engage the material. Some of the upper rollers, as 42ª, 43ª, and 44ª, of each of the frames may be idlers and have smooth faces, their function being to lessen the friction of the material as it is first fed to the machine.

Each of the shafts carrying the serrated disks is provided with a pinion, as 47 and 48, upon the two lower shafts of each frame, and these pinions intermesh with idler-pinions 47ª 48ª, the upper idler meshing with a pinion 49, fixed upon the upper one of the shafts, which are armed with serrated disks, which shaft is also provided with a gear-wheel 50, intermeshing with a gear 51, fixed upon a shaft 52, which shaft also carries a ratchet-wheel 53, with which there coöperates a spring-controlled retaining-pawl 64 for preventing the backward movement of the ratchet-wheel.

A T-bar 55 is mounted so as to reciprocate vertically in a suitable bracket 57, carried by one of the rails 37. The cross member of this bar is tubular, and within this tube there is housed an expanding-spring 54, to each end of which there is attached a dog 56 56 for engaging the ratchet-wheels 53 53. A pin 58 projects laterally from the lower end of the T-bar 55 and preferably carries a friction-roller, as shown. This pin rides upon a cam-bar 59, affixed to the carriage 25. This bar is offset upwardly near each of its ends, and within each of these widened portions there is formed a cam-slot extending obliquely downward toward the end of the bar and adapted to receive the pin 58, so as to draw the T-bar 55 downward at each end of the stroke of the carriage and raise it again as the carriage starts upon its return stroke. By this means the ratchet-wheels 53 53 are drawn downward a step at each stroke of the carriage and the various power-driven feed-rollers are advanced. By properly proportioning the parts—that is to say, the inclination of the cam-slots in the bar 59, the ratchet-wheels 53, and the transmitting-gears—the material is fed downward at the end of each stroke of the carriage a distance equal to the desired thickness of the product.

The material to be reduced will of course be cut of uniform lengths; but any slight irregularities will be compensated for by the spring adjusting mechanism by which the guide-frame 38 is controlled; and a further object in yieldingly supporting one of the guide-frames is that damage to the machine may be escaped should a hard knot be encountered into which the serrated disks of the feed-rollers will not sink.

The feeding mechanism, as hereinbefore described, is capable of simultaneously feeding a plurality of blocks. Indeed, the material may be fed to the machine to the full limit of the capacity of the feeding mechanism, and each piece, whether large or small, will be carried down evenly and uniformly. Should any clogging arise due to the presence of hard knots, the difficulty may be quickly overcome by withdrawing the frame 38 by means of the screw-rod 38ᵈ, when the material may be all quickly removed.

As the shreds are cut from the material by the shaving-blades they fall through the slots at the edges of the knife-plate 31 upon a conveying-apron 66, turning over suitable rollers, as 67 68, journaled in hangers secured to the uprights 22 and 23 and driven by means of a belt 69, running upon a pulley mounted upon the shaft carrying the roller 67, and the pulley 70, mounted upon a shaft 70ª, journaled in hangers secured to the upright 22 and driven by means of a belt 71, leading from a pulley 72 on the power-shaft.

The scoring-blades 34 project slightly above the cutting edges of the knives 32 33, and as they therefore enter the material first they will dislodge therefrom any dirt or bark which may be present, and this will fall through open spaces in the plate 31 at each side of the box 35 and will be received into a trough 31ª, secured to the carriage and leading to one side of the machine.

The carriage 25 is made sufficiently long so that at all times it extends under the material in process of reduction and serves as a stop to limit its downward movement and prevent inequalities in the product due to irregularity in feeding.

Space is left at the base of one of the guide-frames—preferably the frame 39, which is fixed—from which there will be discharged the remnant of each block of material after it has been reduced to such size that it can no longer be held for cutting. Within this space there is located a plate 77, which has a slight vertical play and to that end is provided with dowel-pins 78 78, which loosely fit within suitable sockets in the frame 39, and near its rearward edge with threaded rods 75, which loosely project through a bracket 39ª and at their upper end are each provided with a threaded nut which limits the downward movement of the plate. The lower face of the plate 77 is serrated transversely as to the bed of the machine, so that when a piece of the material is carried below it by the pressure of the shaving-knife it will be retained as the carriage moves in the opposite direction, and at the next stroke of the carriage it will be forced entirely out below this plate. Should there be any slivers broken from the material during the operation of the machine, they will also find ready egress below the plate 77.

In order that the material when reduced to such an extent that it is no longer engaged by the lower feed-rollers may be securely held, the lower cross-rail of each of the guide-frames 38 39 is provided with short spurs 76, each of which is brought to a knife-edge in vertical plane, so that they enter the material as it is forced down by the feed-rollers.

I claim as my invention—

1. In a machine for making excelsior, in combination, a reciprocating plate having shaving-knives and scoring-points, guides for delivering material to such cutters, one of such guides having a remnant-discharge aperture at its base, and means for holding partially-ejected remnants from recession.

2. In a machine for making excelsior, in combination, a suitable frame, a pair of plates for guiding the material to be operated upon, a reciprocating carriage having shaving-knives and scoring-blades and being prolonged beyond such blades to form a stop for the advancing material, space being provided between one of the guiding-plates and the reciprocating carriage for the ejection of remnants.

3. In a machine for making excelsior, in combination, a reciprocating carriage, shaving-knives and scoring-blades mounted upon the carriage, pawl-and-ratchet-actuated feed mechanism for delivering material to such cutters, a reciprocating arm carrying the pawls, a cam-bar mounted longitudinally upon the carriage and having oblique slots near its ends, and a pin on the reciprocating arm adapted to engage such slots.

4. In a machine for making excelsior, in combination, a reciprocating plate having shaving-knives and scoring-points, guides for delivering material to such cutters, one of such guides having a remnant-discharge aperture at its base, and a clamping-plate located in such aperture and having a movement lateral as to the plane in which such cutters travel.

5. In a machine for making excelsior, in combination, a reciprocating plate having shaving-knives and scoring-blades, frames for guiding material to such cutters, one of such frames being spring-supported, serrated feed-rollers carried by the frames, a ratchet-wheel for turning the rollers of each frame, a pawl for driving each ratchet-wheel, means for actuating the pawls, and means for maintaining the pawl in engagement with the ratchet-wheel of the spring-supported frame.

6. In a machine for making excelsior, in combination, a reciprocating knife-carrying plate, relatively adjustable frames for guiding the material, feed-rollers carried by the frames, ratchet-wheels by which such rollers are driven, a reciprocating arm, spring-pawls for turning the ratchet-wheels and being adjustably carried by the arm to compensate for the adjustment of the frames, and means for actuating the arm.

7. In a machine for manufacturing excelsior, in combination, a reciprocating knife-carrying plate, relatively adjustable frames for guiding the material, feed-rollers carried by the frames, ratchet-wheels by which the rollers are turned, a reciprocating arm having a cross-bar, spring-extended pawls carried by such cross-bar for engaging the ratchet-wheels, and means for actuating the arm.

8. In a machine for making excelsior, in combination, a reciprocating plate provided with blades, guides for leading the material to such plate, and continuous feed mechanism, the blade-carrying plate being extended beyond the blades to serve as a stop for the material, and one of the guides being spaced apart from the plate to provide a remnant-discharge aperture.

9. In an excelsior-making machine, in combination, a reciprocating blade-carrying table, guides for directing material to the blades, means for feeding the material uninterruptedly, and means for discharging remnants laterally.

EDGAR J. STEWART.

Witnesses:
PAUL CARPENTER,
LOUIS K. GILLSON.